W. W. BEACH.
Combined Blotter and Moistener.

No. 206,414. Patented July 30, 1878.

Attest:
Chas. M. Higgins
Patrick Martin

Inventor:
W. W. Beach
by his Attorneys:
S. H. Wales & Son

N. PETERS, PHOTO-LITHOGRAPHER, WASHINGTON, D. C.

UNITED STATES PATENT OFFICE.

WILLIAM W. BEACH, OF NEW YORK, N. Y., ASSIGNOR TO RUDOLF MEYER, OF SAME PLACE.

IMPROVEMENT IN COMBINED BLOTTER AND MOISTENER.

Specification forming part of Letters Patent No. 206,414, dated July 30, 1878; application filed May 20, 1878.

*To all whom it may concern:*

Be it known that I, WILLIAM W. BEACH, of New York city, in the State of New York, have invented a Novel Combined Blotter and Moistener, of which the following is a specification:

The object of my invention is to provide a simple device adapted for a variety of office purposes, and which shall combine a moistening-pad for the moistening of envelope-flaps, postage-stamps, &c., with a blotting-pad adapted for the ordinary use of a blotter.

My invention is embodied in a number of distinct features, which will be first fully described, and each feature of novelty distinctly indicated in the concluding clauses.

Figure 1:
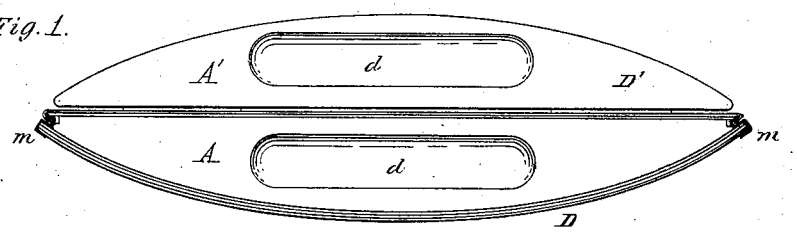
Figure 2:
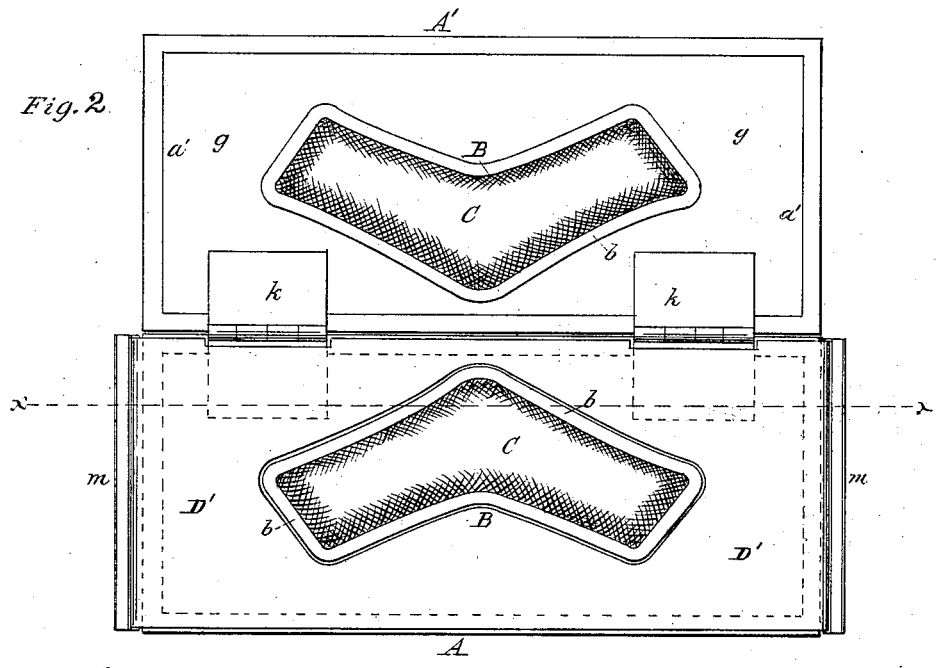
Figure 3:
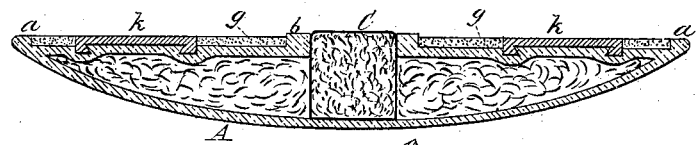

The annexed drawings present, in Figure 1, a longitudinal view of my improved device in a closed position. Fig. 2 is a plan view of the same fully opened. Fig. 3 is a longitudinal section of one half on line *x x* of Fig. 2; and Fig. 4 is a transverse section of both halves, partly opened.

Figure 4:
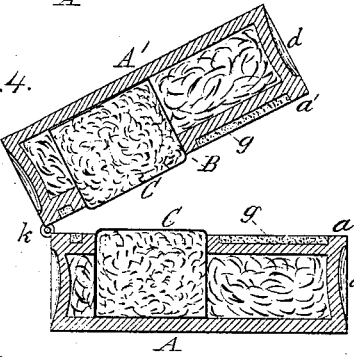

As shown in Figs. 1, 2, and 4, I prefer to construct my device double or in similar halves, A A', which are hinged together on one side, as shown at *k k*, so as to be capable of being closed together, as shown in Fig. 1, or opened apart, as shown in Figs. 2 and 4. Each half consists of a hollow shell or shallow tray, A A', preferably flat on the top side and curved on the under side, as represented.

The internal hollow of the shell is adapted for the retention of water or moisture, and is preferably filled with coarse sponge, as indicated, or other suitable absorbent material. The top or flat surface of each of the shells is provided with a raised marginal bead, *a a'*, as represented, and is perforated with a central aperture, B, the margin of which is also provided with a similar raised bead or rim, *b*. This aperture is fitted with a moistening-pad, C, the surface of which extends slightly above the marginal beads, as represented in Figs. 3 and 4.

The pad is preferably formed of cloth filled with fine sponge, and is of the same shape as the aperture of the shell, being snugly inserted therein, and embraces the interior filling of coarse sponge, as represented in Figs. 3 and 4.

The central aperture and moistening-pad are preferably made of a shape corresponding to that of the gummed part of an envelope-flap, as shown in Fig. 2, so that it is thus adapted for the convenient and cleanly moistening of envelope-flaps at the gummed part without exposing any other part to the wet; and, while being of this particular shape, it is, of course, as well adapted for general moistening purposes, such as moistening postage-stamps, also the tips of the fingers in counting bills, &c. It will be seen that the advantage of constructing the device double and in two hinged halves is that when opened two persons at opposite sides of a desk may use the moisteners at the same time without interference with each other, and when shut together, as in Fig. 1, the moisteners are preserved from dust and evaporation, while at the same time the two pads coincide and the moisture distributes from one to the other; hence, in case one pad is unduly moist, by closing the halves together and placing the driest side under the moisture immediately distributes itself to the proper extent from one to the other.

The upper surface of the shells being thus provided with a moistener, the under surface is fitted with a blotter, D, which is preferably made curved, as shown, to adapt the blotter to be used by a rocking movement.

The blotter is preferably so formed as to fit both the flat top and curved under side of the shells and to be slipped upon the same as a sleeve, as shown in Figs. 1 and 2, which forms a simple manner of attaching the blotting-pad to its sustaining-core; and it is designed to construct the pads in this manner for resupplying the blotter when the first one is worn out.

The flat-top blotter D' has an opening cut therein to be free of the moistening-pad C, and to allow it to project through the same, as shown in Fig. 2; and the flat and curved blotters D D' are joined at the ends by a line of stitching or a metal binding, *m*, of an S form, as shown in Figs. 1 and 2. The upper blotter, D', thus forms an absorbent margin around the moistening-pad, on which any excessive moisture applied by the pad to the stamp or envelope may be removed before withdrawing the same, and also serves to absorb any escape of moisture from the pad and prevent its reaching the edges of the shells. In addition to this removable marginal blotter D, the marginal depression of the shells surrounding the central moistening-pad is filled level with the marginal beads $a\ a'$ by an absorbent covering, $g\ g$, of felt or other suitable material, which answers a similar purpose when the top blotter, D', is not used.

The sides of the shells are formed with rounded depressions $d\ d$ to permit the grasp of the fingers in handling the device, and the hinges are tightly fitted, so that the shells will remain in a closed or opened position when so placed without requiring any extra fastening.

Thus formed, I prefer to construct the shells of blown or molded glass of an ornamental color and design, as this material has the advantages of cheapness, beauty, and of being non-corrosive. When the halves are shut together it will be seen that the top blotter, D', will act as a cushion between the edges and prevent any injury to the glass, the outer or curved surface being also covered by a cushion of blotting-paper, D. The glass will thus be effectually preserved from any injurious concussions. The margin of the moistener-apertures may also be fitted with a rubber ring, which will form a moisture-tight joint and cushion when the halves are shut together; but this is not necessary.

When the shells are formed of glass I prefer to use metal hinges, which are attached by the act of molding by forming the leaves of the hinges with dovetailed cavities, into which the glass is blown, as represented at $k\ k$ in Fig. 3, the pintles of the hinges being inserted when the halves are fitted together, this construction being cheap and very secure. The shell is blown from the moistener-aperture B, which forms the mouth or neck of the vessel, and is the point where the "break-off" occurs, giving rough edge, which is desirable.

What I claim as my invention is—

1. A double moistening device formed of two similar halves or hollow shells, A A', hinged to each other on one side and capable of being opened apart or closed together, and provided with coinciding moistening-pads on their meeting-faces, substantially as herein shown and described.

2. A combined blotter and moistener formed of a hollow shell, A, adapted to retain moisture, and having its upper surface provided with a moistening-pad, C, and its under surface fitted with a blotting-pad, D, as herein shown and described.

3. A combined blotter and moistener formed of a hollow shell, A A', adapted to retain moisture, having a flat upper surface fitted with a moistening-pad and a curved rocking under surface fitted with a blotting-pad, as shown and described.

4. A moistening device formed of a hollow shell, having its top fitted with a central moistening-pad, together with a marginal absorbing-cushion encircling the moistening-pad, as shown and described.

5. The combination of a moistening device, adapted to sustain a blotter, with a blotting-pad formed as a sleeve to be slipped thereupon, and having an opening cut therein to permit the projection of the moistening-pad through the same, substantially as herein shown and described.

DR. WM. W. BEACH.

Witnesses:
CHAS. M. HIGGINS,
EDWARD H. WALES.